US010237755B2

(12) United States Patent
Guo et al.

(10) Patent No.: US 10,237,755 B2
(45) Date of Patent: Mar. 19, 2019

(54) METHOD AND APPARATUS FOR HANDLING BEAMFORMING IN A WIRELESS COMMUNICATION SYSTEM

(71) Applicant: ASUSTek Computer Inc., Taipei (TW)

(72) Inventors: Yu-Hsuan Guo, Taipei (TW); Richard Lee-Chee Kuo, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 9 days.

(21) Appl. No.: 15/641,792

(22) Filed: Jul. 5, 2017

(65) Prior Publication Data

US 2018/0014208 A1 Jan. 11, 2018

Related U.S. Application Data

(60) Provisional application No. 62/359,002, filed on Jul. 6, 2016.

(51) Int. Cl.

| | |
|---|---|
| ***H04W 16/28*** | (2009.01) |
| ***H04B 7/024*** | (2017.01) |
| ***H04B 7/06*** | (2006.01) |

(52) U.S. Cl.

CPC ............ *H04W 16/28* (2013.01); *H04B 7/024* (2013.01); *H04B 7/0617* (2013.01)

(58) Field of Classification Search

CPC ...... H04W 16/28; H04B 7/0617; H04B 7/024

See application file for complete search history.

(56) References Cited

U.S. PATENT DOCUMENTS

| | | | | |
|---|---|---|---|---|
| 6,233,466 | B1 | 5/2001 | Wong | |
| 10,069,555 | B2 * | 9/2018 | Islam | H04B 7/0639 |
| 2015/0358129 | A1 | 12/2015 | Ryu | |
| 2016/0099761 | A1 * | 4/2016 | Chen | H04B 7/0408 370/336 |
| 2017/0346534 | A1 * | 11/2017 | Islam | H04W 52/04 |

FOREIGN PATENT DOCUMENTS

| | | |
|---|---|---|
| WO | 2016210302 | 12/2016 |

OTHER PUBLICATIONS

Office Action from the Taiwan Intellectual Property Office in the corresponding TW Application No. 106122537, dated Aug. 20, 2018.

(Continued)

*Primary Examiner* — Afshawn M Towfighi

(74) *Attorney, Agent, or Firm* — Blue Capital Law Firm, P.C.

(57) ABSTRACT

A method and apparatus are disclosed for handling beamforming in a wireless communication system. In one embodiment, the method includes receiving a second signal indicating a number of beam sweeping from a cell, wherein there are multiple network nodes in the cell and at least two network nodes of the cell have different beamforming capabilities. The method also includes receiving a first signal from any network node of the cell at multiple time intervals based on the number of beam sweeping.

20 Claims, 24 Drawing Sheets

110
112
118
116
120
108
104
106
126
122
124
100
114

(56) References Cited

OTHER PUBLICATIONS

Nokia et al: "Support for Beam Based Common Control Plane", 3GPP Draft; R1-165364, 3rd Generation Partnership Project (3GPP), Mobile Competence Centre ; 650, Route Des Luci0les ; F-06921 Sophia-Antipolis Cedex ;France , vol. RAN WG1, no. Nanjing, P.R. China; May 23, 2016-May 27, 2016 May 13, 2016 (May 13, 2016), XP051096653, Retrieved from the Internet: URL:http://www. 3gpp•org/ftp/tsg_ran/WG1_RL1/TSGR1_85/Docs/.

European Search Report from corresponding EP Application No. 17179757.4, dated Nov. 10, 2017.

Nokia, Alcatel-Lucent Shanghai Bell, Support for Beam Based Common Control Plane in 5G New Radio[online],3GPP TSG-RAN WG1#84b R1-162895, <URL:http://www.3gpp.org/ftp/tsg_ran/WG1_RL1/TSGR1_84b/Docs/R1-162895.zip>,Apr. 15, 2016.

Intel Corporation, Discussion of mobility related definition and terminology in NR[online], 3GPP TSG-RAN WG2#94 R2-163578, <URL:http://www.3gpp.org/ftp/tsg_ran/WG2_RL2/TSGR2_94/Docs/R2-163578.zip>, May 27, 2016.

Office Action from Japan Patent Office in corresponding JP Application No. 2017-131577, dated Sep. 11, 2018.

Nokia Alcatel-Lucent : "Support for Beam Based Common Control Plane", R1-165364, 3GPP RAN-WG1, May 23-27, 2016. Retrieved from the Internet: URL:http://www.3gpp•org/ftp/tsg_ran/WG1_RL1/TSGR1_85/Docs/.

Office Action from the Korean Intellectual Property Office in corresponding KR Application No. 10-2017-0085391, dated Oct. 2, 2018.

* cited by examiner

METHOD AND APPARATUS FOR HANDLING BEAMFORMING IN A WIRELESS COMMUNICATION SYSTEM

CROSS-REFERENCE TO RELATED APPLICATIONS

The present Application claims the benefit of U.S. Provisional Patent Application Ser. No. 62/359,002 filed on Jul. 6, 2016, the entire disclosure of which is incorporated herein in their entirety by reference.

FIELD

This disclosure generally relates to wireless communication networks, and more particularly, to a method and apparatus for handling beamforming in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed for handling beamforming in a wireless communication system. In one embodiment, the method includes receiving a second signal indicating a number of beam sweeping from a cell, wherein there are multiple network nodes in the cell and at least two network nodes of the cell have different beamforming capabilities. The method also includes receiving a first signal from any network node of the cell at multiple time intervals based on the number of beam sweeping.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts", Nokia, Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; R3-160947, "TR 38.801 V0.1.0, Study on New Radio Access Technology; Radio Access Architecture and Interfaces"; R2-164306, "Summary of email discussion [93bis#23][NR] Deployment scenarios", NTT DOCOMO; 3GPP RAN2#94 meeting minute; R2-163879, "RAN2 Impacts in HF-NR", MediaTeK; R2-162210, "Beam level management <-> Cell level mobility", Samsung; R2-163471, "Cell concept in NR", CATT; R2-164270, "General considerations on LTE-NR tight interworking", Huawei; R2-162251, "RAN2 aspects of high frequency New RAT", Samsung; R1-165364, "Support for Beam Based Common Control Plane", Nokia, Alcatel-Lucent Shanghai Bell. The standards and documents listed above are hereby expressly incorporated by reference in their entirety.

Figure 1:
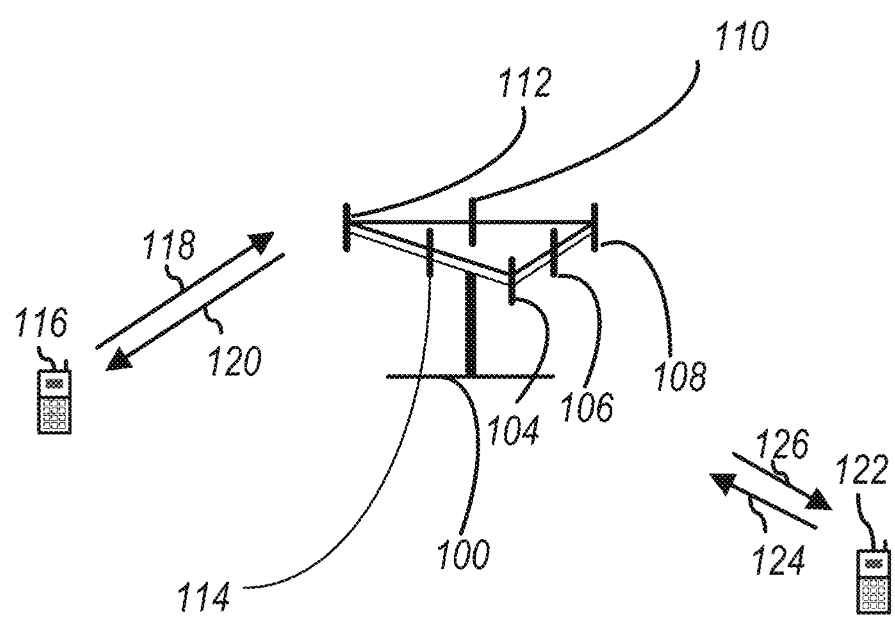
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
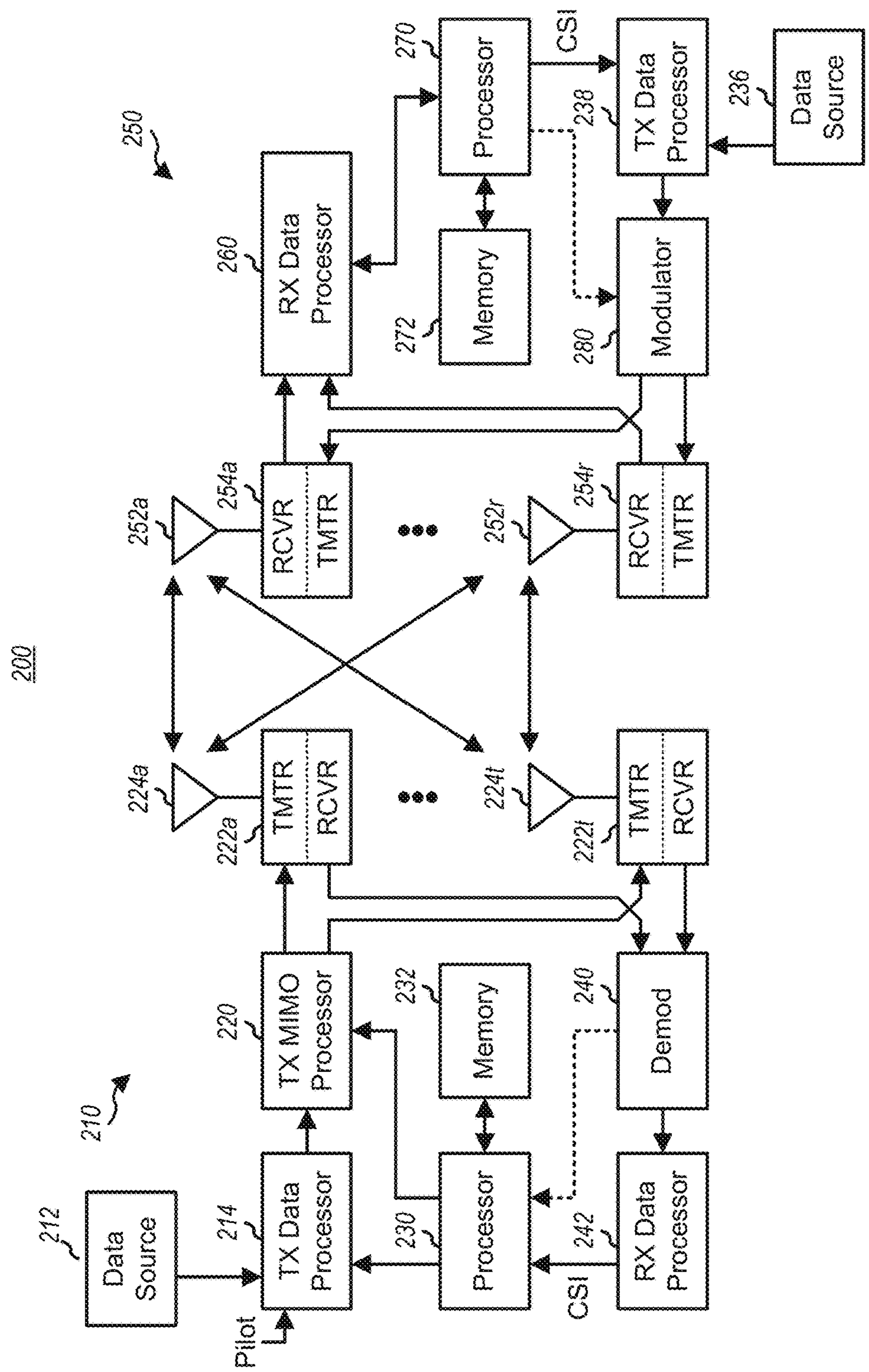
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by $N_R$ antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254*a* through 254*r*, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
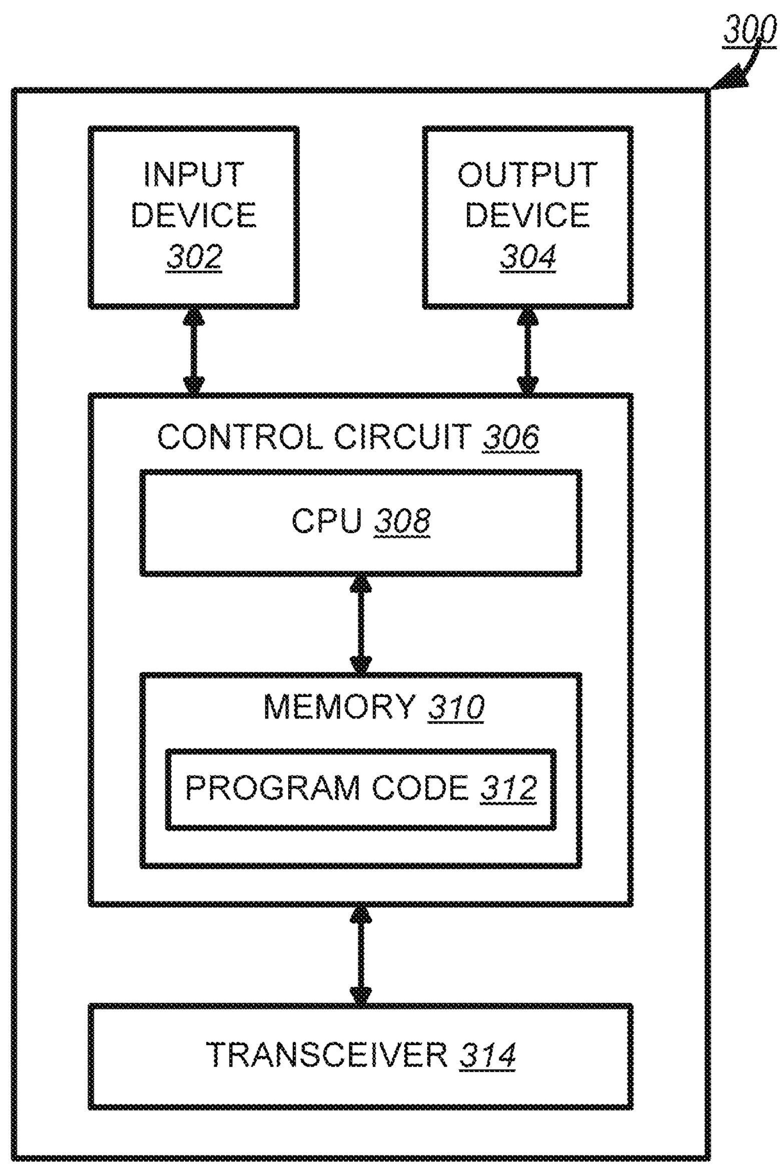
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
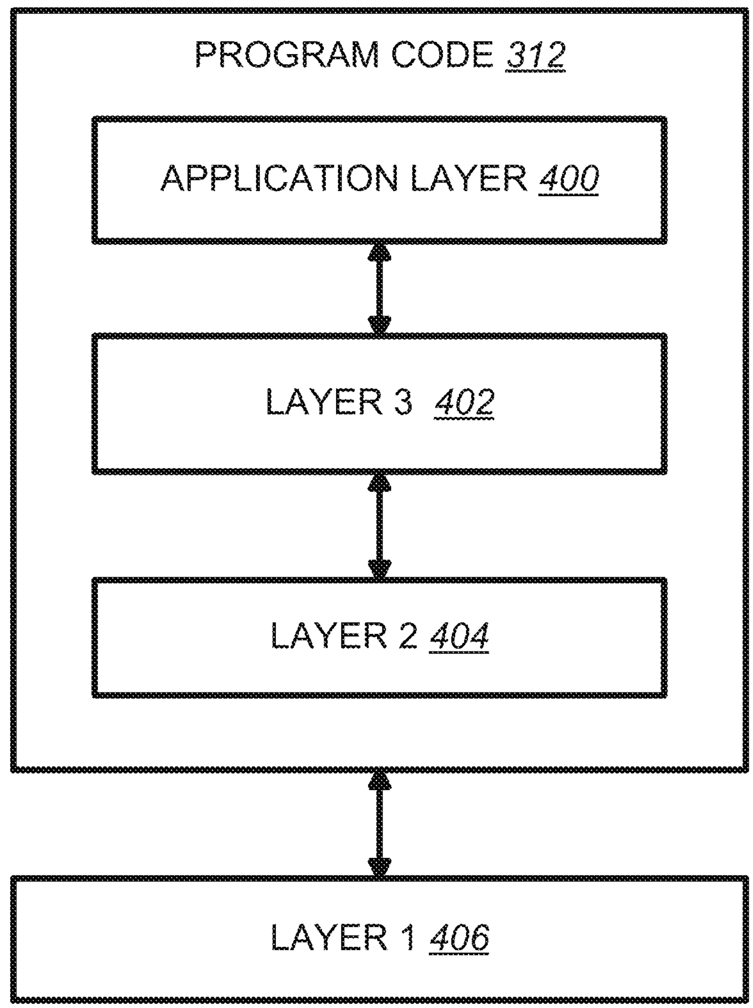
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. The next generation access technology aims to support the following three families of usage scenarios for satisfying both the urgent market needs and the more long-term requirements set forth by the ITU-R IMT-2020 as follows:

eMBB (enhanced Mobile Broadband)

mMTC (massive Machine Type Communications)

URLLC (Ultra-Reliable and Low Latency Communications)

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

Based on 3GPP R2-162366, in lower frequency bands (e.g, current LTE bands <6 GHz) the required cell coverage may be provided by forming a wide sector beam for transmitting downlink common channels. However, utilizing wide sector beam on higher frequencies (>>6 GHz), the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (e.g., number of antenna elements ranging from tens to hundreds) are used to form high gain beams.

As a consequence, the high gain beams are narrow compared to a wide sector beam so multiple beams for transmitting downlink common channels are needed to cover the required cell area. The number of concurrent high gain beams that access point is able to form may be limited by the cost and complexity of the utilized transceiver architecture. In practice, on higher frequencies, the number of concurrent high gain beams is much less than the total number of beams required to cover the cell area. In other words, the access point is able to cover only part of the cell area by using a subset of beams at any given time.

Based on 3GPP R2-163716, beamforming is a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas.

Figure 5:
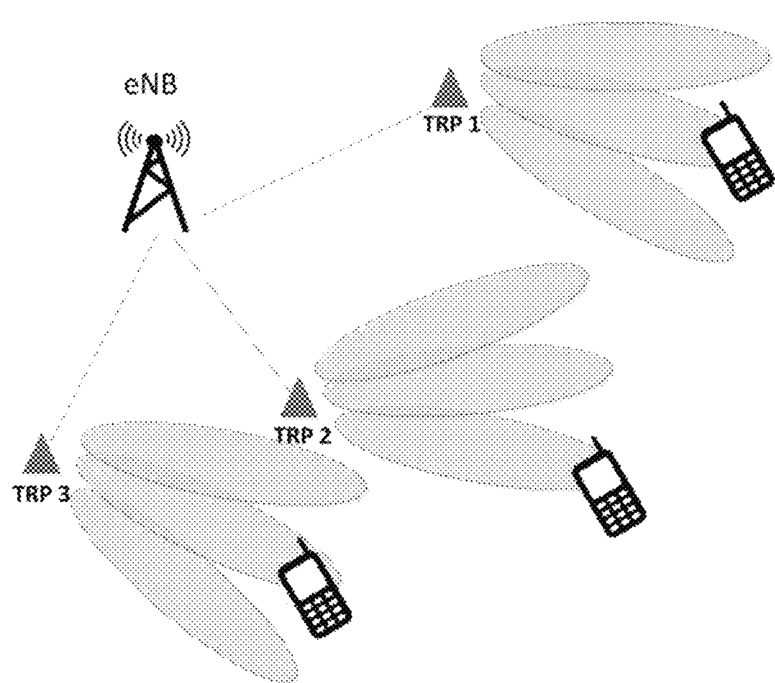
FIG. 5 is a reproduction of FIG. 1 of 3GPP R2-162709.

Based on 3GPP R2-162709 and as shown in FIG. 5 (which is a reproduction of FIG. 1 of 3GPP R2-162709), an eNB may have multiple TRPs (either centralized or distributed). Each TRP can form multiple beams. The number of beams and the number of simultaneous beams in the time/frequency domain depend on the number of antenna array elements and the RF (Radio Frequency) at the TRP.

Potential mobility type for NR (New Radio) Access Technology can be listed as follows:

Intra-TRP mobility

Inter-TRP mobility

Inter-NR eNB mobility

Based on 3GPP R2-162762, reliability of a system purely relying on beamforming and operating in higher frequencies might be challenging, since the coverage might be more sensitive to both time and space variations. As a consequence, the SINR of the narrow link can drop much quicker than in the case of LTE.

Using antenna arrays at access nodes with the number of elements in the hundreds, fairly regular grid-of-beams coverage patterns with tens or hundreds of candidate beams per node may be created. The coverage area of an individual beam from such array may be small, down to the order of some tens of meters in width. As a consequence, channel quality outside the current serving beam area would degrade quicker than in the case of wide area coverage, as provided by LTE.

Figure 6:
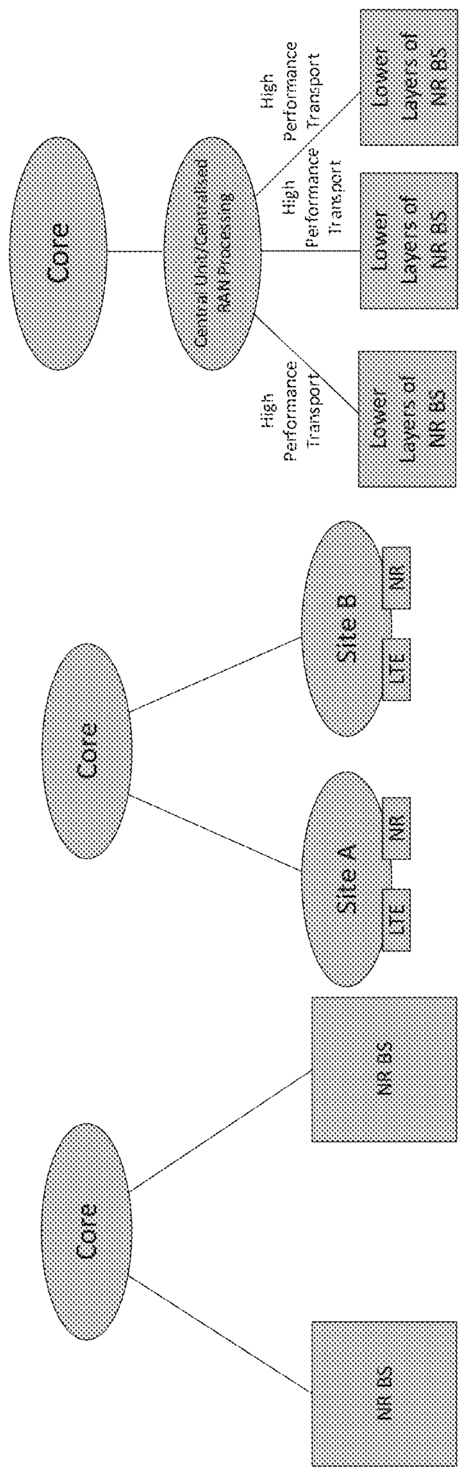
FIG. 6 is a diagram according to one exemplary embodiment.
Figure 7:
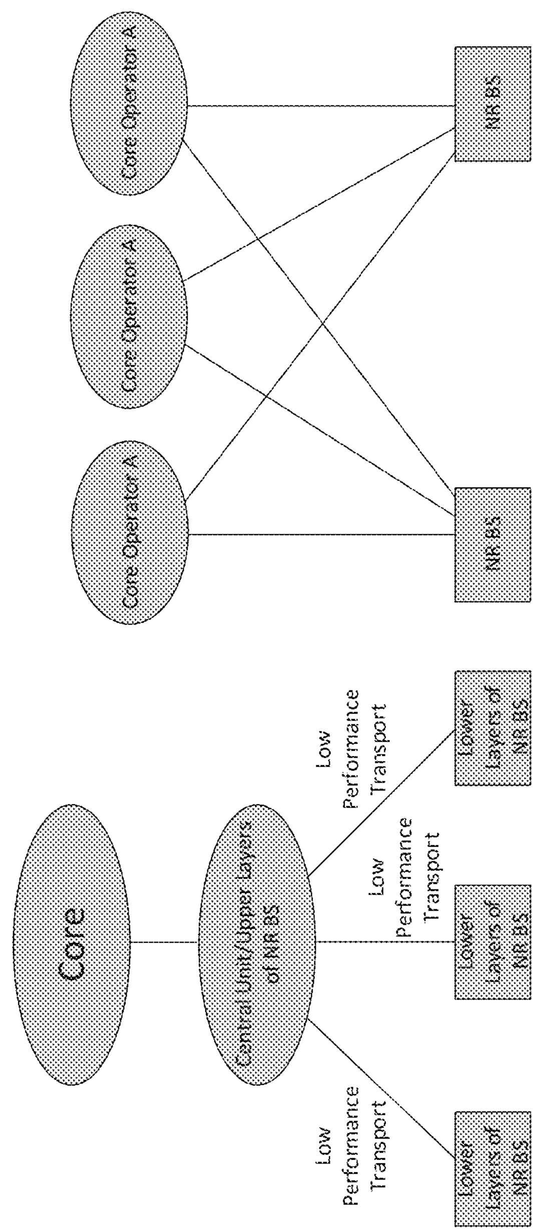
FIG. 7 is a diagram according to one exemplary embodiment.

Based on 3GPP R3-160947, the scenarios illustrated in FIGS. 6 and 7 should be considered for support by the NR radio network architecture.

Based on 3GPP R2-164306, the following scenarios in terms of cell layout for standalone NR are captured to be studied:

Macro cell only deployment

Heterogeneous deployment

Small cell only deployment

Based on 3GPP RAN2#94 meeting minutes, 1 NR eNB corresponds to 1 or many TRPs. Two levels of network controlled mobility are as follows:

RRC driven at 'cell' level.

Zero/Minimum RRC involvement (e.g. at MAC/PHY)

Based on R2-162210, in 5G, the principle of 2-level mobility handling may possibly be kept as follows:

A) Cell level mobility
   a. Cell selection/reselection in IDLE, handover in CONN
   b. Handled by RRC in CONN state B) Beam level management
   a. L1 handles appropriate selection of the TRP to use for a UE and the optimal beam direction 5G systems are expected to rely more heavily on "beam based mobility" to handle UE mobility, in addition to regular handover based UE mobility. Technologies like MIMO (Multiple Input Multiple Output), fronthauling, C-RAN (Cloud Radio Access Network), and NFV (Network Function Virtualization) will allow the coverage area controlled by one "5G Node" to grow, thereby increasing the possibilities for beam level management and reducing the need for cell level mobility. All mobility within the coverage area of one 5G node could in theory be handled based on beam level management, which would leave handovers only to be used for mobility to the coverage area of another 5G Node.

Figure 8:
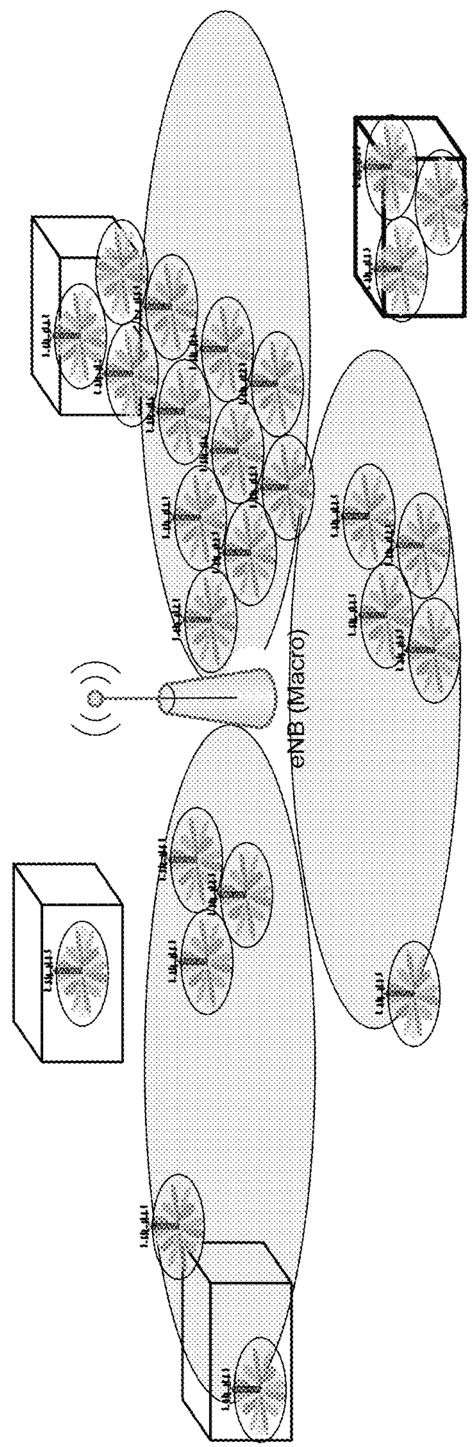
FIG. 8 is a reproduction of a diagram in FIG. 1 of 3GPP R2-163879.
Figure 9:
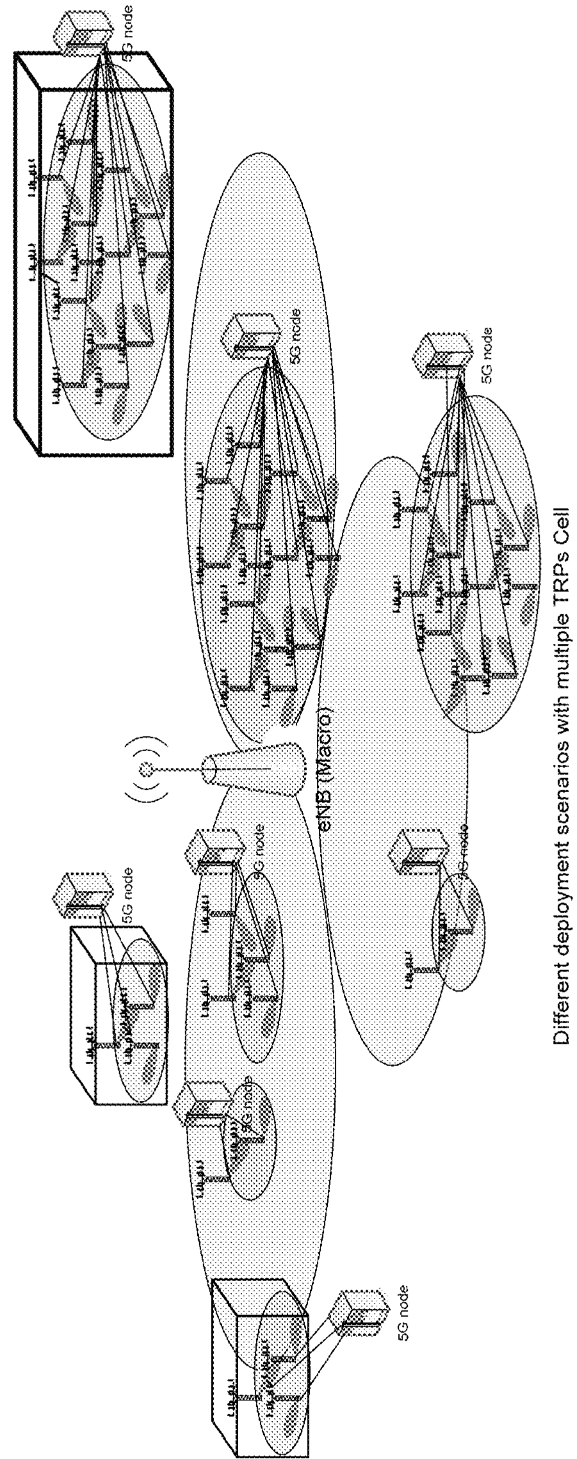
FIG. 9 is a reproduction of a diagram in FIG. 1 of 3GPP R2-163879.
Figure 10:
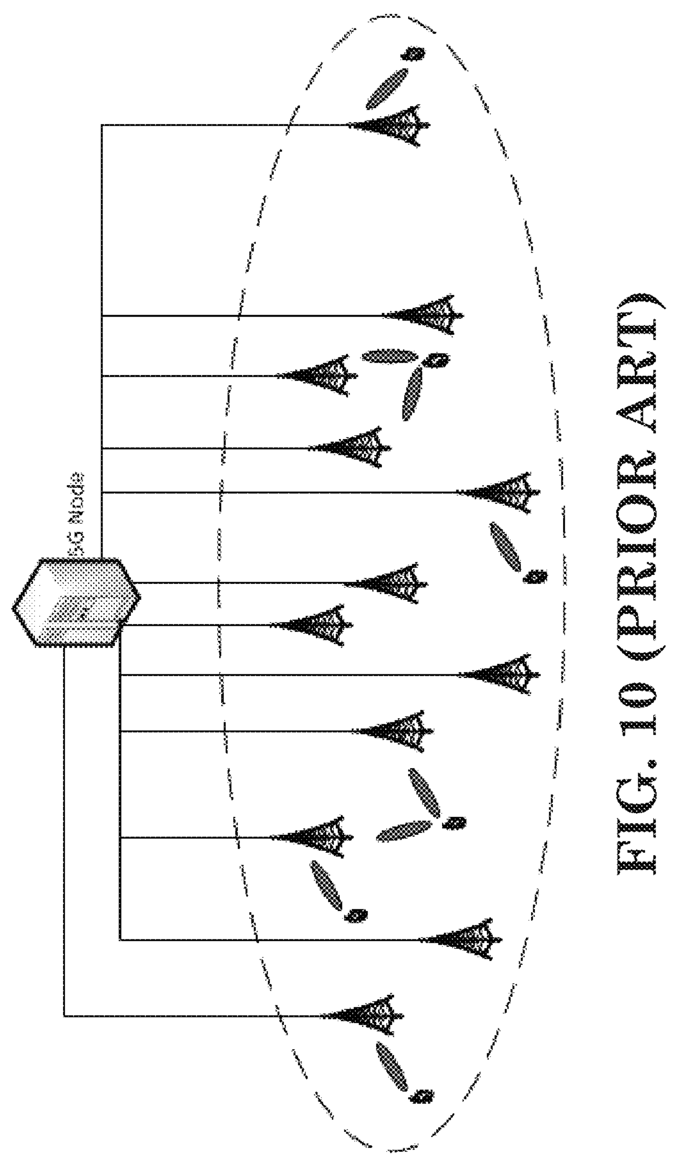
FIG. 10 is a reproduction of FIG. 3 of 3GPP R2-162210.
Figure 11:
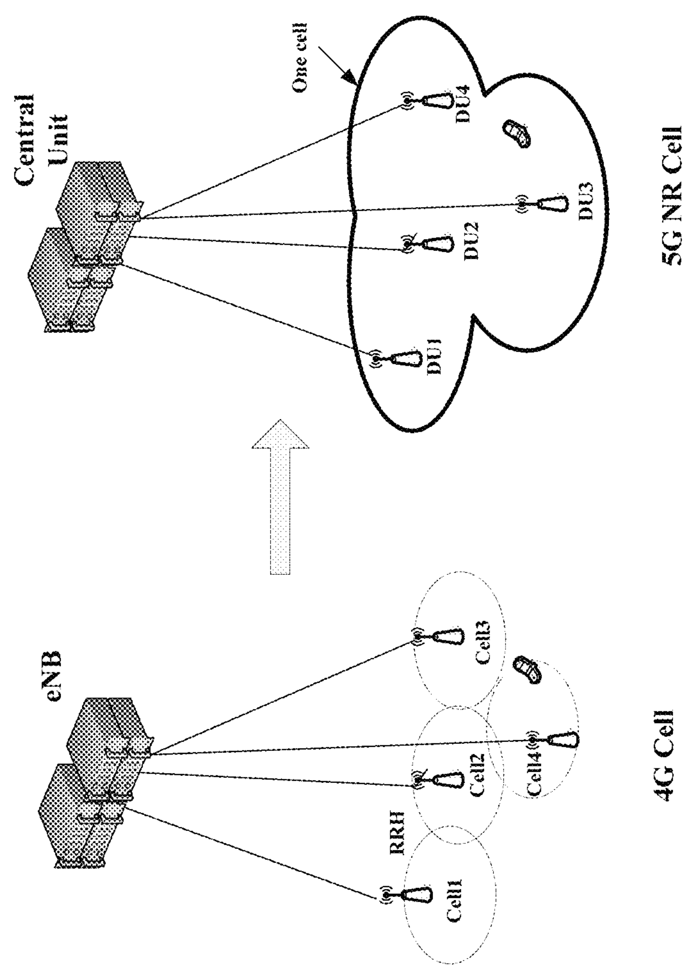
FIG. 11 is a reproduction of FIG. 1 of 3GPP R2-163471.

FIGS. 8 to 11 show some example of the concept of a cell in 5G NR. FIG. 8 (a reproduction of a diagram in FIG. 1 of 3GPP R2-163879) shows a deployment with single TRP cell. FIG. 9 (a reproduction of a diagram in FIG. 1 of 3GPP R2-163879) shows a deployment with multiple TRP cell. FIG. 10 (a reproduction of FIG. 3 of 3GPP R2-162210) shows one 5G cell comprising a 5G node with multiple TRPs. FIG. 11 (a reproduction of FIG. 1 of 3GPP R2-163471) shows a comparison between a LTE cell and a NR cell.

Apart from the handover based on RRM (Radio Resource Management) measurement, a 5G UE should be able to adapt the serving beam to maintain 5G connectivity subject to beam quality fluctuation or UE intra-cell mobility. In order to do so, 5G Node-B and UE should be able to track and change the serving beam properly (called beam tracking hereafter).

Based on 3GPP R2-164270, the design of the new RAT must be forward compatible with Phase II specification and beyond. For forward compatible consideration, and to avoid duplicated discussion, it does not expect different low layer designs for standalone NR and the NR used for tight interworking, and prefer the lower layer of standalone NR should be same as the one used for the tight interworking.

The following terminologies and assumption may be used hereafter:

- BS: A network central unit in NR which is used to control one or multiple TRPs which are associated with one or multiple cells. Communication between BS and TRP(s) is via fronthaul. BS could also be referred to as central unit (CU), eNB, or NodeB.
- TRP: A transmission and reception point provides network coverage and directly communicates with UEs. TRP could also be referred to as distributed unit (DU).
- Cell: A cell is composed of one or multiple associated TRPs, i.e., coverage of the cell is composed of coverage of all associated TRP(s). One cell is controlled by one BS. Cell could also be referred to as TRP group (TRPG).
- Beam sweeping: In order to cover all possible directions for transmission and/or reception, a number of beams is required. Since it is not possible to generate all these beams concurrently, beam sweeping generally means to generate a subset of these beams in one time interval and change generated beam(s) in other time interval(s), i.e., changing beam in time domain. So, all possible directions can be covered after several time intervals.
- Beam sweeping number: A beam sweeping number is a necessary number of time interval(s) to sweep beams in all possible directions once for transmission and/or reception. In other words, a signaling applying beam sweeping would be transmitted a "beam sweeping number" of times within one time period, e.g., the signaling is transmitted in (at least partially) different beams in different times of the time period.

The following assumptions for network side may be used hereafter:

- NR using beamforming could be standalone, i.e., UE can directly camp on or connect to NR.
  - NR using beamforming and NR not using beamforming could coexist, e.g., in different cells.
- TRP would apply beamforming to both data and control signaling transmissions and receptions, if possible and beneficial.
  - Number of beams generated concurrently by TRP depends on TRP capability, e.g., maximum number of beams generated concurrently by different TRPs in the same cell may be the same and those in different cells may be different.
  - Beam sweeping is necessary, e.g., for the control signaling to be provided in every direction.
- Downlink timing of TRPs in the same cell are synchronized.
- RRC layer of network side is in BS.
- TRP should support both UEs with UE beamforming and UEs without UE beamforming, e.g., due to different UE capabilities or UE releases.

The following assumptions for UE side may be used hereafter:

- UE may perform beamforming for reception and/or transmission, if possible and beneficial.
  - Number of beams generated concurrently by UE depends on UE capability, e.g. generating more than one beam is possible.
  - Beam(s) generated by UE is wider than beam(s) generated by eNB.
  - Beam sweeping for transmission and/or reception is generally not necessary for user data but may be necessary for other signaling, e.g., to perform measurement.
  - Not every UE supports UE beamforming, e.g. due to UE capability or UE beamforming is not supported in NR first (few) release(s).
- One UE is possible to generate multiple UE beams concurrently and to be served by multiple serving beams from one or multiple TRPs of the same cell.
  - Same or different (DL or UL) data could be transmitted on the same radio resource via different beams for diversity or throughput gain.
- There are at least two UE (RRC) states: connected state (or called active state) and non-connected state (or called inactive state or idle state).

Figure 12:
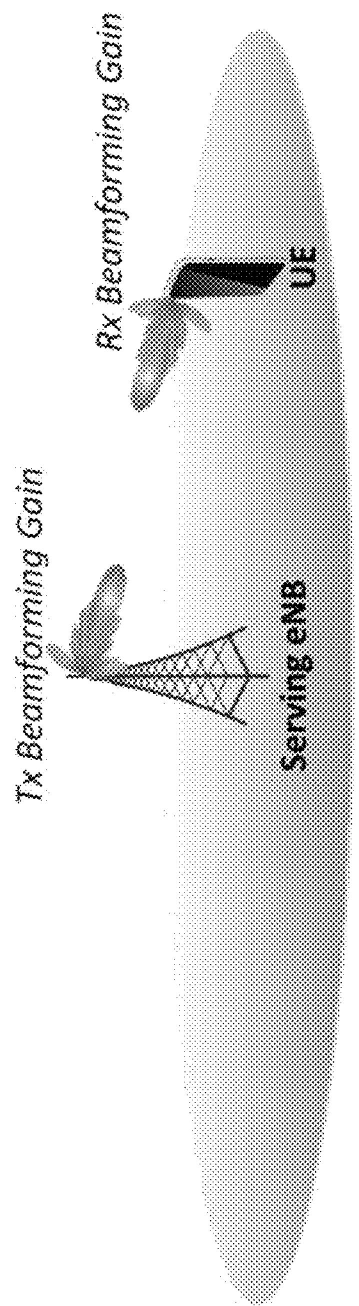
FIG. 12 is a reproduction of FIG. 3 of 3GPP R2-162251.

Based on 3GPP R2-162251, to use beamforming in both eNB and UE sides, practically, antenna gain by beamforming in eNB is considered about 15 to 30 dBi and the antenna gain of UE is considered about 3 to 20 dBi. FIG. 12 (a reproduction of FIG. 3 of 3GPP R2-162251) illustrates gain compensation by beamforming.

Figure 13:
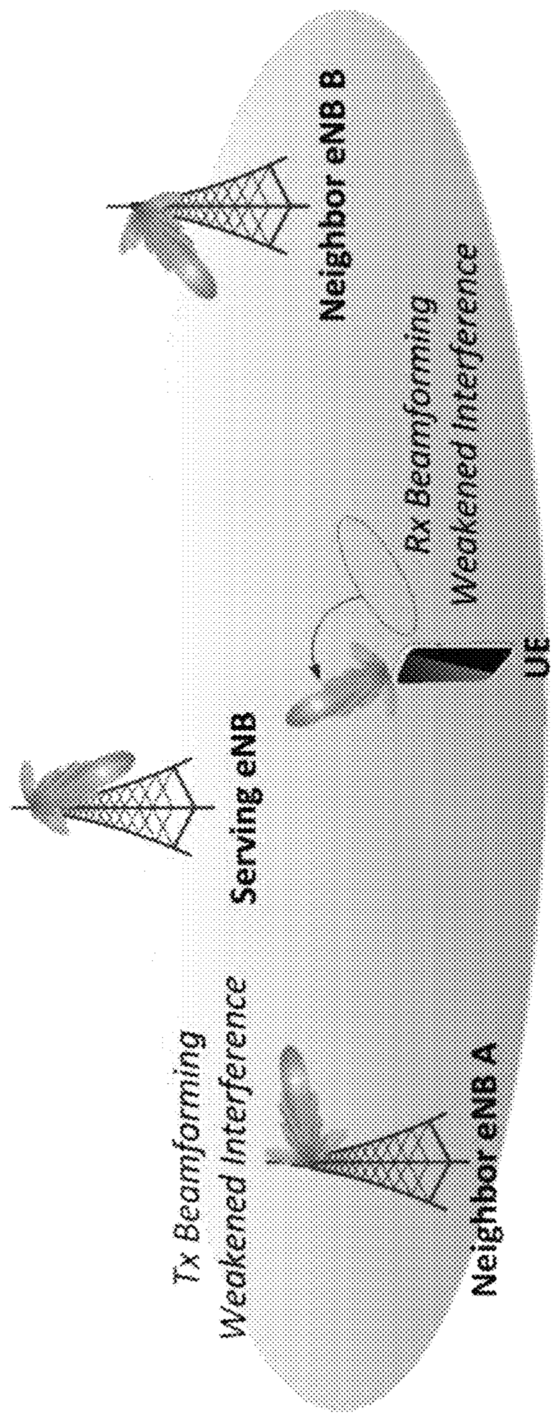
FIG. 13 is a reproduction of FIG. 4 of 3GPP R2-162251.

From the perspective of SINR (Signal to Interference Plus Noise Ratio), sharp beamforming reduces interference power from neighbor interferers, i.e., neighbor eNBs in downlink case or other UEs connected to neighbor eNBs. In TX (Transmission) beamforming case, only interference from other TXs whose current beam points the same direction to the RX will be the "effective" interference. The "effective" interference means the interference power is higher than the effective noise power. In RX (Reception) beamforming case, only interference from other TXs whose beam direction is the same to the UE's current RX beam direction will be the effective interference. FIG. 13 (a reproduction of FIG. 4 of 3GPP R2-162251) illustrates weakened interference by beamforming.

After a UE powers on, the UE needs to find a cell to camp on. Then, the UE may initiate a connection establishment to network by itself for registration and/or data transmission. Besides, network could also request the UE to initiate a connection establishment to the network via paging, e.g., in order to transmit DL (Downlink) data to the UE.

A case of initial access may have the following steps:

- Cell search—Possible carrier frequencies are scanned to find a cell. The cell provides signaling for UEs to identify the cell, e.g., synchronization signal, by beam sweeping. Different TRPs of the same cell would provide the same signaling at the same time interval(s).
- Broadcasted system information acquisition—UE acquires necessary parameters, e.g. related to cell selection, from broadcasted system information. The broadcasted system information is provided by beam sweeping.

Cell measurement & selection—After the UE finds a cell which is possible to camp on, the UE should measure radio condition of the cell and decide whether to camp on the cell based on the measured result. The cell provides signaling for measurement, e.g. reference signal, by beam sweeping. Different TRPs of the same cell would provide the signaling at the same time interval(s).

Paging—Paging may be required when network would like to transmit UE specific signaling/data and the UE is in a non-connected state. When the UE receives paging, the UE should initiate connection establishment to enter connected state for reception. The cell provides paging by beam sweeping.

Connection establishment—UE establishes connection to BS via connection establishment procedure. During the procedure, the UE needs to perform random access procedure to let network be aware of the UE and provide resources for UL transmission to UE.

Figure 14:
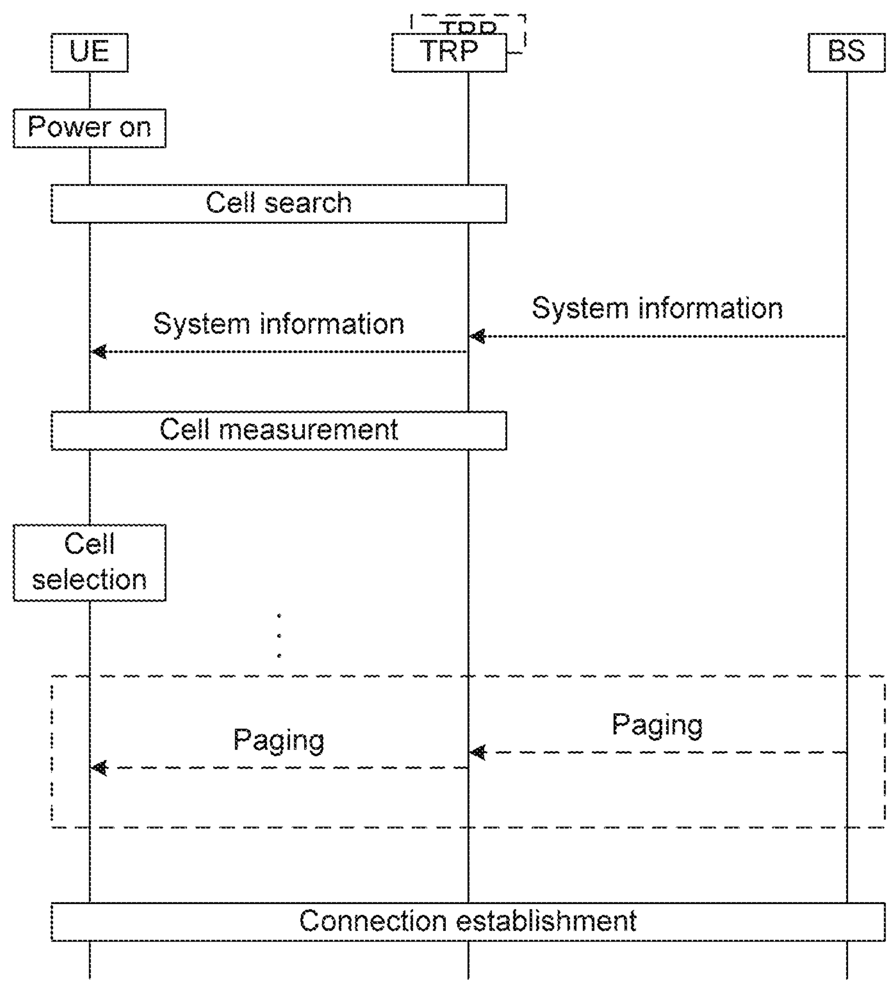
FIG. 14 is a flow chart according to one exemplary embodiment.

FIG. 14 illustrates an example of a flow chart for initial access.

Figure 15:
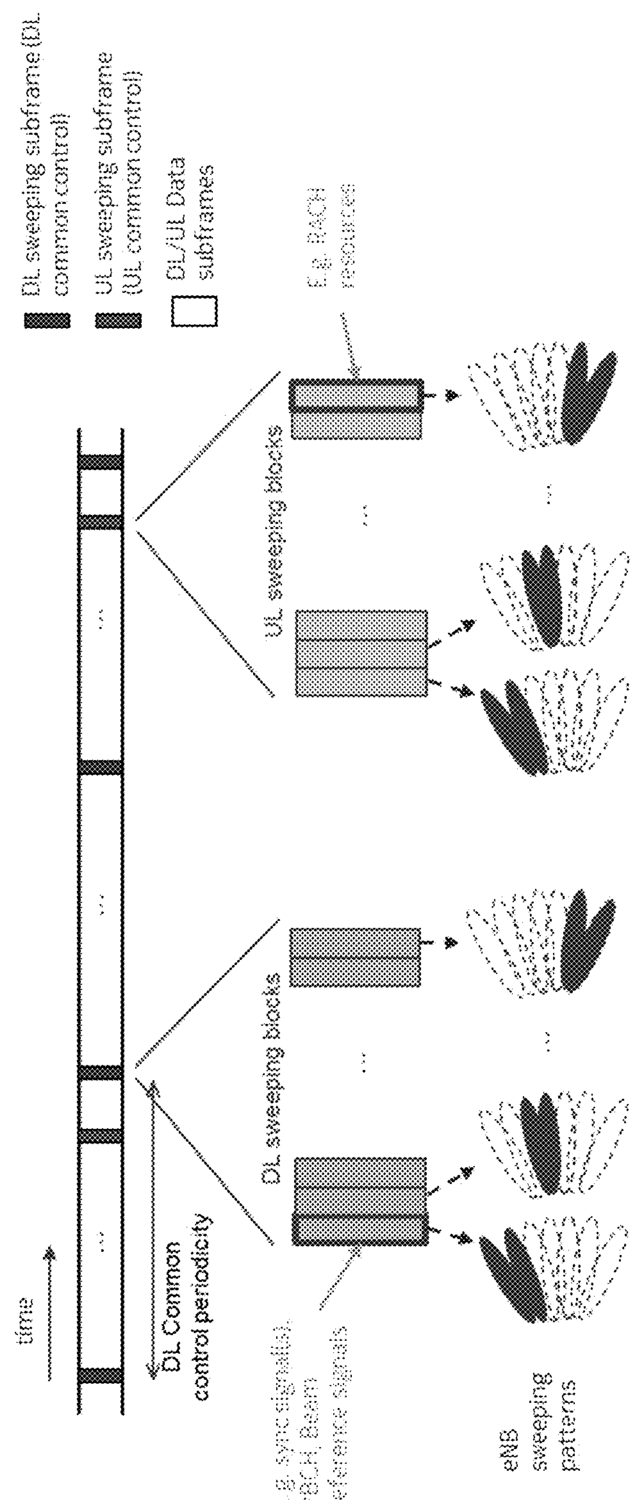
FIG. 15 is a reproduction of FIG. 1 of 3GPP R1-165364.

3GPP R1-165364 proposed to concentrate sweeping common control plane functionality into specific subframes, called as sweeping subframes. The common control signaling to be transmitted in sweeping subframe includes synchronization signal (DL), reference signal (DL), system information (DL), random access channel (UL), etc. FIG. 15 (a reproduction of FIG. 1 of 3GPP R1-165364) illustrates the principle of sweeping subframe.

One of the main use cases of downlink sweeping is downlink discovery signaling, which comprises for instance signals for cell search, time and frequency synchronization acquisition, essential system information signalling and cell/beam measurements (e.g., RRM measurements).

Figure 16:
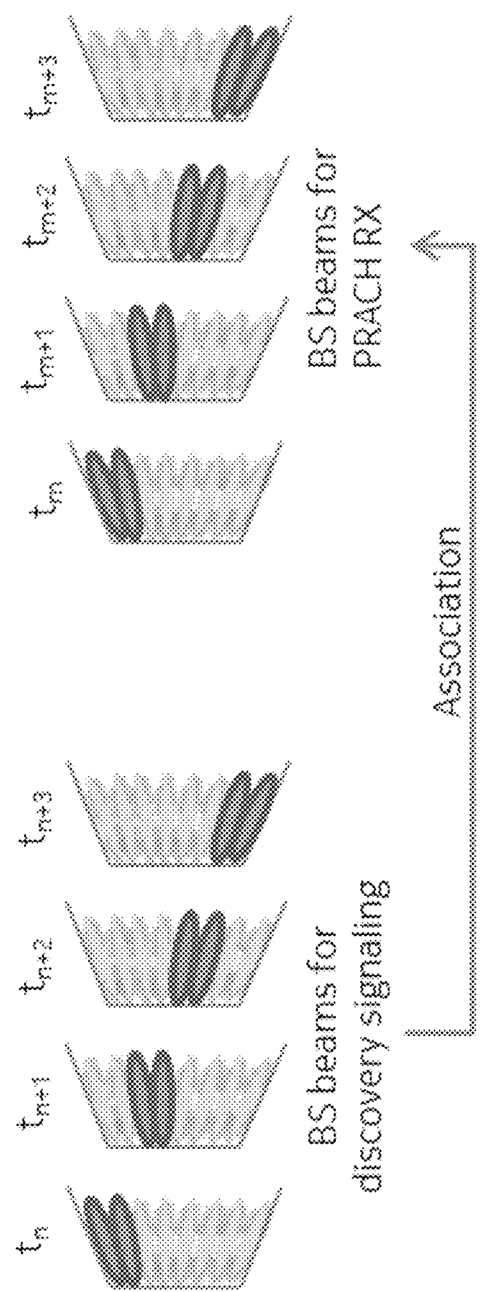
FIG. 16 is a reproduction of FIG. 2 of 3GPP R1-165364.

For UL (Uplink) PRACH (Physical Random Access Channel), the high level idea is to utilize BS beam reciprocity and enable a UE to transmit PRACH preamble when a BS is receiving using beam(s) with high array gain towards the transmitting UE. That means the PRACH resources are associated with the BS beams which are advertised periodically through DL discovery signalling, which conveys beam specific reference signals. FIG. 16 (a reproduction of FIG. 2 of 3GPP R1-165364) illustrates the association between BS beams and PRACH resources.

Figure 17:
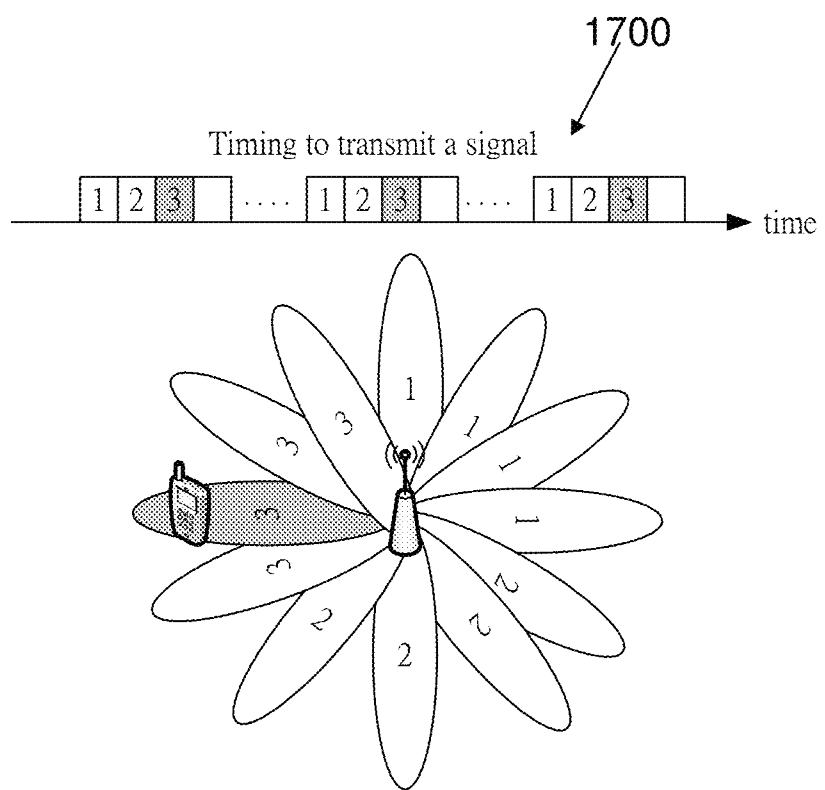
FIG. 17 is a diagram according to one exemplary embodiment.

Since high gain beams are narrow and the number of concurrent high gain beams that can be formed may depend on cost and complexity of the utilized transceiver architecture, beam sweeping is needed for a number of times, e.g., beam sweeping number, to cover all possible directions for transmission and/or reception. For example, in FIG. 17, the TRP takes 3 time intervals to cover all directions and 4 beams are generated at each time interval by this TRP.

Signaling for transmission and/or reception, which needs to cover the whole cell coverage by beam sweeping, may include synchronization signal(s), reference signal(s), system information, paging, signal to initiate random access procedure, signals of random access procedure (e.g., random access preamble, random access response, contention resolution), signal for DL/UL scheduling, and/or etc. For downlink signaling, beam sweeping is performed by a TRP for transmission and/or by a UE for reception. For uplink signaling, beam sweeping is performed by a UE for transmission and/or by a TRP for reception.

Based on beam sweeping number of a cell or a TRP and possibly some other parameter(s), the UE accessing the cell or connecting to the TRP could understand the timing where the TRP is transmitting or receiving the signaling. If the UE does not know the beam sweep number, the UE does not know whether to receive or transmit the signaling in a specific time interval. For example, since the UE cannot know whether the signaling is not transmitted by network or is not received due to bad radio condition, the UE may keep measuring reference signal or monitoring paging in time interval(s) when the signaling is not transmitted by the TRP. Or the UE may keep transmitting signal for random access procedure in time interval(s) when the TRP would not receive. Power consumption is increased, and derivation of measurement results may be incorrect (e.g., not reflecting the actual radio condition).

One possible way is to fix the beam sweeping number of the signaling. However, beam sweeping number could depend on capability of network device(s). Fixing the beam sweeping number would limit implementation of network vendors as well as limit scheduling flexibility. Alternatively, the UE should be aware of beamforming capability of the TRP or the cell.

A method to indicate the beam sweeping number to the UE could be considered. The way to indicate the beam sweeping number could be explicit or implicit. The beam sweeping number could be indicated by one or more of the following signaling: (i) synchronization signal(s), (ii) reference signal(s), (iii) system information, and/or (iv) paging. The system information, e.g. master information block (MIB) or primary system information, is broadcasted. The beam sweeping number could be applied to some or all of the signals/signaling requiring beam sweeping in downlink and/or uplink.

For implicit indication, different transmission patterns of the signaling, e.g. synchronization signal(s) or reference signal(s), could be defined corresponding to different beam sweeping number. The patterns could be differentiated by different transmitting timing or frequency resources. Then, the UE could know the beam sweeping number by detecting which pattern is used by a TRP (or a cell). For explicit indication, the beam sweeping number could be derived from information included in the signaling. N bits are needed to signal $2^N$ possible values.

Before the UE acquires the beam sweeping number, if the UE needs to acquire a signaling where beam sweeping is applied, the UE could assume a default beam sweeping number for the signaling. For example, it is assumed that beam sweeping number is indicated by system information. If the UE needs to receive reference signal(s) before acquiring system information, the UE receives the reference signal(s) based on the default beam sweeping number. Furthermore, the UE receives signaling based on the beam sweeping number indicated by system information after the beam sweeping number is acquired.

In another aspect, if interworking (e.g., via dual connectivity) between different RATs or between cell(s) using beam sweeping and cell(s) not using beam sweeping is assumed, a UE could connect to a primary cell (e.g., a LTE cell or a cell not using beam sweeping), and connect to one or more secondary cells at the same time. The beam sweeping number of the secondary cell(s) could be indicated via the primary cell, e.g., included in the configuration to add the secondary cell as a serving cell of the UE. Then, the beam sweeping number of a cell could be known before connecting to the cell.

On the other hand, since it is up to network implementation whether beam sweeping is needed (e.g., a cell in lower frequency band may also use beamforming or beam sweeping to increase coverage, or digital beamforming does not need beam sweeping), the UE may need to know whether a TRP or a cell uses beam sweeping or not in order to decide timing for reception and/or transmission. Similarly, the UE may need to know whether a TRP or a cell uses beamforming or not.

The above method(s) could explicitly or implicitly indicate whether a TRP or a cell uses beam sweeping. Similarly, the above method(s) could explicitly or implicitly indicate whether a TRP or a cell uses beamforming or not. Alternatively, beam sweeping number could be used to inform the UE whether beam sweeping is used by the cell or the TRP. Similarly, beam sweeping number could be used to inform the UE whether beamforming is used by the cell or the TRP. For example, the absence of the beam sweeping number information or the beam sweeping number equals to zero or one may be used to represent that beam sweeping is not used. Similarly, the absence of the beam sweeping number information or the beam sweeping number equals to zero or one may be used to represent that beamforming is not used.

From the point of view of a UE, the beam sweeping number is more like a scaling number indicating scaling level of a signaling transmission in time domain. The signaled beam sweeping number could be considered as a number of how many time intervals the UE needs to monitor (or transmit) a specific signal in a time period. The UE determines to monitor (or transmit) the specific signal for how many and in which time intervals (at least) based on the beam sweeping number. The time intervals may be continuous or interleave. Other parameters may also be provided to the UE for the determination. For example, if paging is transmitted every x TTIs (Transmission Time Intervals) and the signaled beam sweeping number is y, the UE monitors paging for y TTIs every x TTIs at the paging occasion of the UE.

In addition, since it is up to network implementation whether UE beamforming is supported by network and could be used by UE for transmission and/or reception, the UE also needs to know whether a TRP or a cell supports or enables UE beamforming in order to decide timing for reception and/or transmission. The above method(s) could explicitly or implicitly indicate whether a TRP or a cell supports or enables UE beamforming. The UE also needs to know the number of beams to be generated concurrently by UE. The above method(s) could explicitly or implicitly indicate the number of beams to be generated by UE.

In a cell with multiple TRPs where each TRP operates with multiple beams, it is possible that not all TRPs in the cell have the same capability with respect to beamforming, e.g., total number of beams, maximum number of beams that can be generated concurrently, minimum beam sweeping number, or etc. As mentioned above, a signal of a cell may be transmitted by beam sweeping in order to cover whole cell coverage. The signal may include synchronization signal(s), reference signal(s), system information, and/or paging. If the number of beams which a TRP can generate concurrently is less than total number of beams in the TRP, and if at least two TRPs of the cell have different total numbers of beams, it would be beneficial to share a same beam sweeping number among all TRPs of the cell so that each TRP of the cell could transmit the same signal to UEs in the cell at multiple time intervals in beam sweeping manner with the same beam sweeping number.

Keeping beam sweeping number aligned among TRPs in the same cell can reduce overhead of signaling the beam sweeping number. If beam sweeping number of TRPs in a cell is aligned or less than the beam sweeping number indicated to the UE, the cell does not need to signal different beam sweeping numbers for different TRPs, or the UE does not need to reacquire the beam sweeping number when changing TRP within a cell. In other words, the actual beam sweeping number performed by TRPs in the cell should be less or equal to the indicated beam sweeping number associated with the cell. In addition, some degree of flexibility can still be reached since beam sweeping number in different cells can be different.

The beam sweeping number could be the number of time intervals to sweep beams in all directions once for transmission and/or reception. The beam sweeping number could be indicated to UEs to be served by the cell. Actual number of beam sweeping performed by a TRP should not be larger than (e.g., could be less than or equal to) the indicated beam sweeping number. A same number of beams could be generated by the TRP at multiple time intervals for transmitting a signal.

The above information (e.g., beam sweeping number, usage of beam sweeping by network, enabling UE beamforming, etc.) could be indicated by the same signaling or different signaling. Beam sweeping is performed to provide whole coverage of the cell or the TRPs. The number of beam sweeping is determined based on the maximum number of beams that can be generated concurrently by the TRP and/or other TRP of the cell, and the total number of beams in the TRP and/or other TRP of the cell. The time interval may be a unit on time domain (e.g., TTI, subframe, or symbol).

Figure 18:
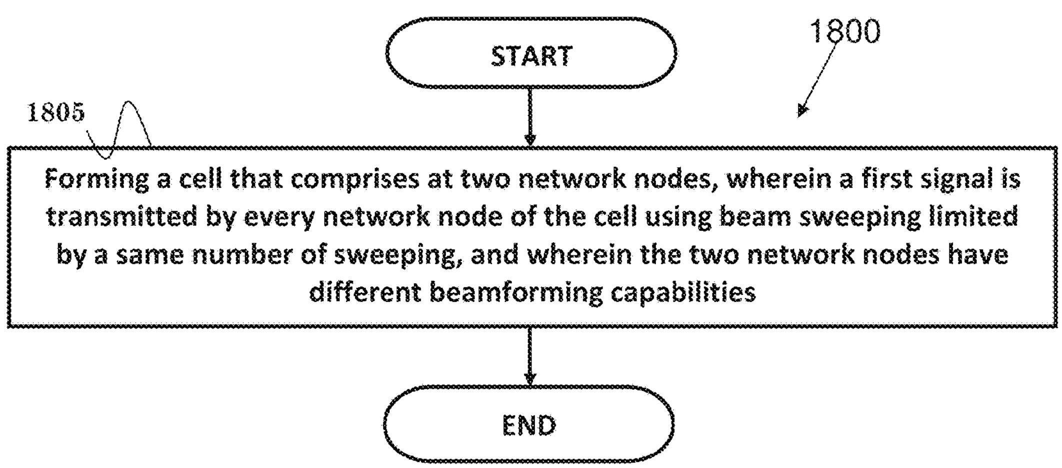
FIG. 18 is a flow chart according to one exemplary embodiment.

FIG. 18 is a flow chart 1800 according to one exemplary embodiment from the perspective of a network. In step 1805, the network forms a cell that comprises at least two network nodes, wherein a first signal is transmitted by every network node of the cell using beam sweeping limited by a same number of beam sweeping, and wherein the two network nodes have different beamforming capabilities.

Referring back to FIGS. 3 and 4, the device 300 includes a program code 312 stored in the memory 310. The CPU 308 could execute program code 312 to form a cell that comprises at least two network nodes, wherein a first signal is transmitted by every network node of the cell using beam sweeping limited by a same number of beam sweeping, and wherein the two network nodes have different beamforming capabilities. Furthermore, the CPU 308 can execute the program code 312 to perform all of the above-described actions and steps or others described herein.

Figure 19:
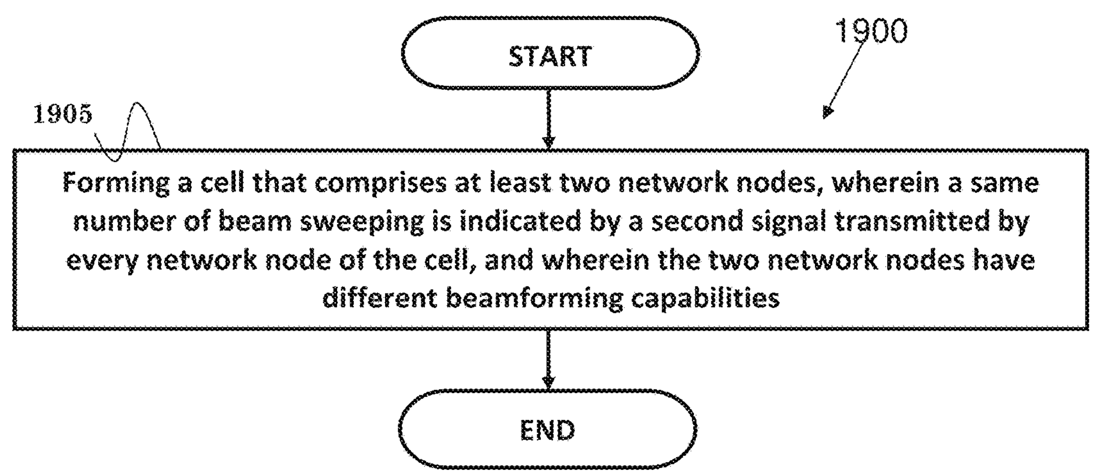
FIG. 19 is a flow chart according to one exemplary embodiment.

FIG. 19 is a flow chart 1900 according to one exemplary embodiment from the perspective of a network. In step 1905, the network forms a cell that comprises at least two network nodes, wherein a same number of beam sweeping is indicated by a second signal transmitted by every network node of the cell, and wherein the two network nodes have different beamforming capabilities.

Referring back to FIGS. 3 and 4, the device 300 includes a program code 312 stored in the memory 310. The CPU 308 could execute program code 312 to form a cell that comprises at least two network nodes, wherein a same number of beam sweeping is indicated by a second signal transmitted by every network node of the cell, and wherein the two network nodes have different beamforming capabilities. Furthermore, the CPU 308 can execute the program code 312 to perform all of the above-described actions and steps or others described herein.

Figure 20:
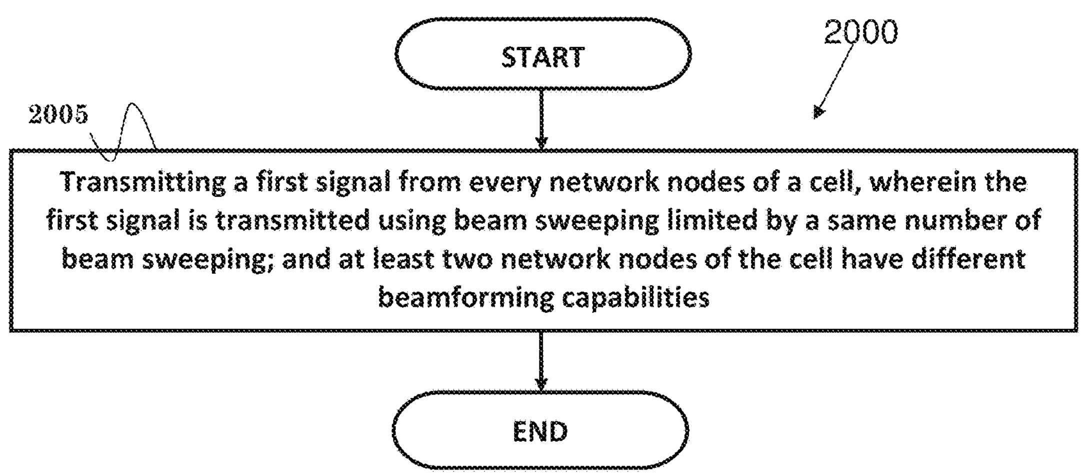
FIG. 20 is a flow chart according to one exemplary embodiment.

FIG. 20 is a flow chart 2000 according to one exemplary embodiment from the perspective of a network. In step 2005, the network transmits a first signal from every network nodes of a cell, wherein the first signal is transmitted using beam sweeping limited by a same number of beam sweeping; and at least two network nodes of the cell have different beamforming capabilities.

Referring back to FIGS. 3 and 4 the device 300 includes a program code 312 stored in the memory 310. The CPU 308 could execute program code 312 to transmit a first signal from every network nodes of a cell, wherein the first signal is transmitted using beam sweeping limited by a same number of beam sweeping; and at least two network nodes of the cell have different beamforming capabilities. Furthermore, the CPU 308 can execute the program code 312 to perform all of the above-described actions and steps or others described herein.

Figure 21:
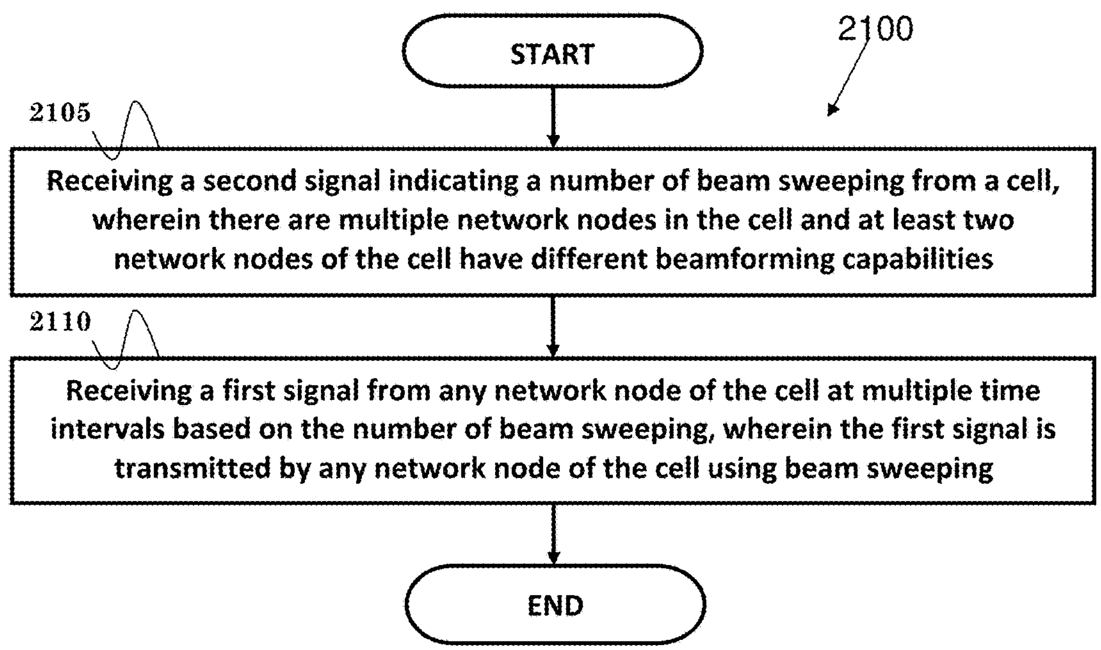
FIG. 21 is a flow chart according to one exemplary embodiment.

FIG. 21 is a flow chart 2100 according to one exemplary embodiment from the perspective of a UE. Step 2105 includes receiving a second signal indicating a number of beam sweeping from a cell, wherein there are multiple network nodes in the cell and at least two network nodes of the cell have different beamforming capabilities. Step 2110 includes receiving a first signal from any network node of the cell at multiple time intervals based on the number of beam sweeping. The first signal is transmitted by any network node of the cell using beam sweeping.

Referring back to FIGS. 3 and 4, in one exemplary embodiment of a UE, the device 300 includes a program code 312 stored in the memory 310. The CPU 308 could execute program code 312 to enable the UE (i) to receive a second signal indicating a number of beam sweeping from a cell, wherein there are multiple network nodes in the cell and at least two network nodes of the cell have different beamforming capabilities, and (ii) to receive a first signal from any network node of the cell at multiple time intervals based on the number of beam sweeping. Furthermore, the CPU 308 can execute the program code 312 to perform all of the above-described actions and steps or others described herein.

Figure 22:
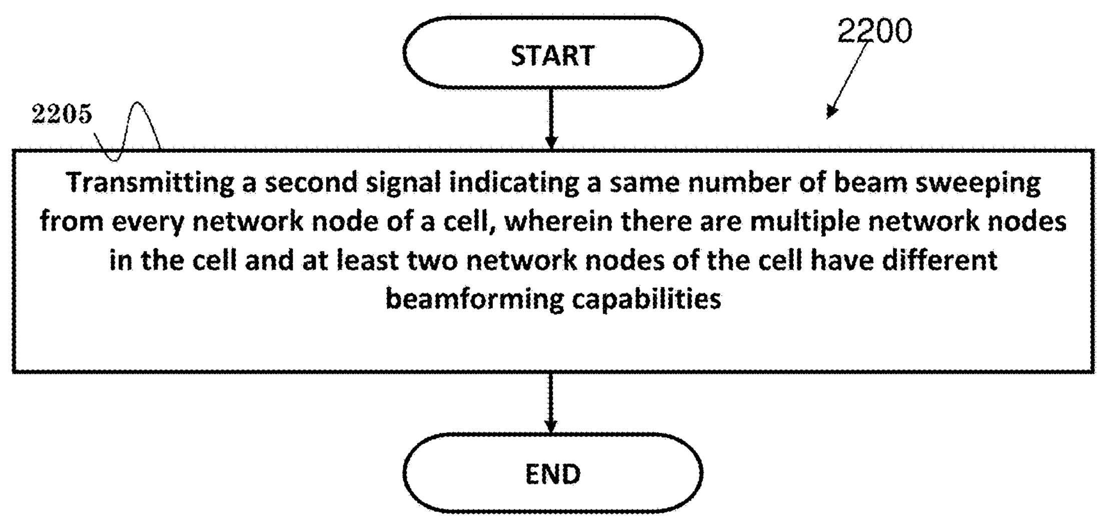
FIG. 22 is a flow chart according to one exemplary embodiment.

FIG. 22 is a flow chart 2200 according to one exemplary embodiment from the perspective of a network. In step 2205, the network transmits a second signal indicating a same number of beam sweeping from every network node of a cell, wherein there are multiple network nodes in the cell and at least two network nodes of the cell have different beamforming capabilities.

Referring back to FIGS. 3 and 4 the device 300 includes a program code 312 stored in the memory 310. The CPU 308 could execute program code 312 to transmit a second signal indicating a same number of beam sweeping from every network node of a cell, wherein there are multiple network nodes in the cell and at least two network nodes of the cell have different beamforming capabilities. Furthermore, the CPU 308 can execute the program code 312 to perform all of the above-described actions and steps or others described herein.

Figure 23:
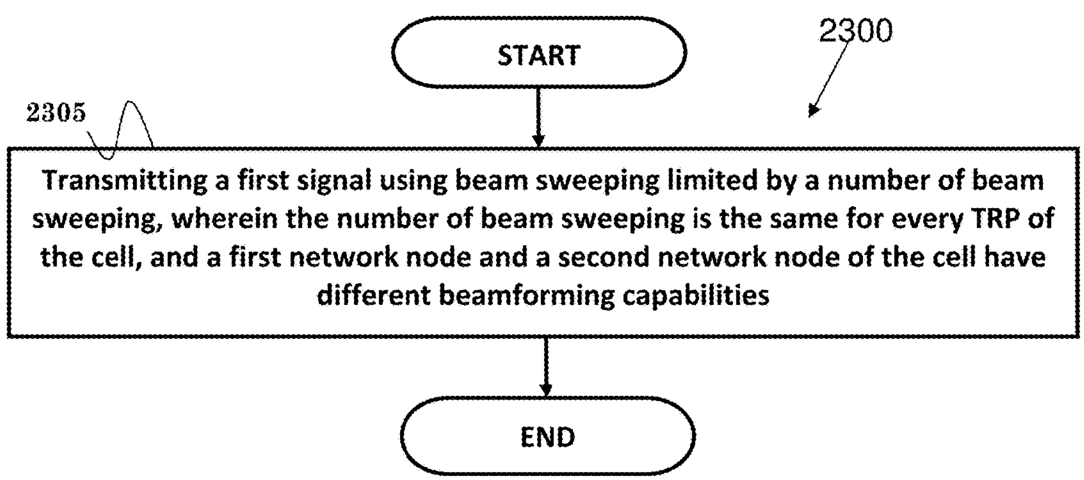
FIG. 23 is a flow chart according to one exemplary embodiment.

FIG. 23 is a flow chart 2300 according to one exemplary embodiment from the perspective of a network node. In step 2305, the network node of a cell transmits a first signal using beam sweeping limited by a number of beam sweeping, wherein the number of beam sweeping is the same for every TRP of the cell, and a first network node and a second network node of the cell have different beamforming capabilities.

Referring back to FIGS. 3 and 4 the device 300 includes a program code 312 stored in the memory 310. The CPU 308 could execute program code 312 to transmit a first signal using beam sweeping limited by a number of beam sweeping, wherein the number of beam sweeping is the same for every TRP of the cell, and a first network node and a second network node of the cell have different beamforming capabilities. Furthermore, the CPU 308 can execute the program code 312 to perform all of the above-described actions and steps or others described herein.

Figure 24:
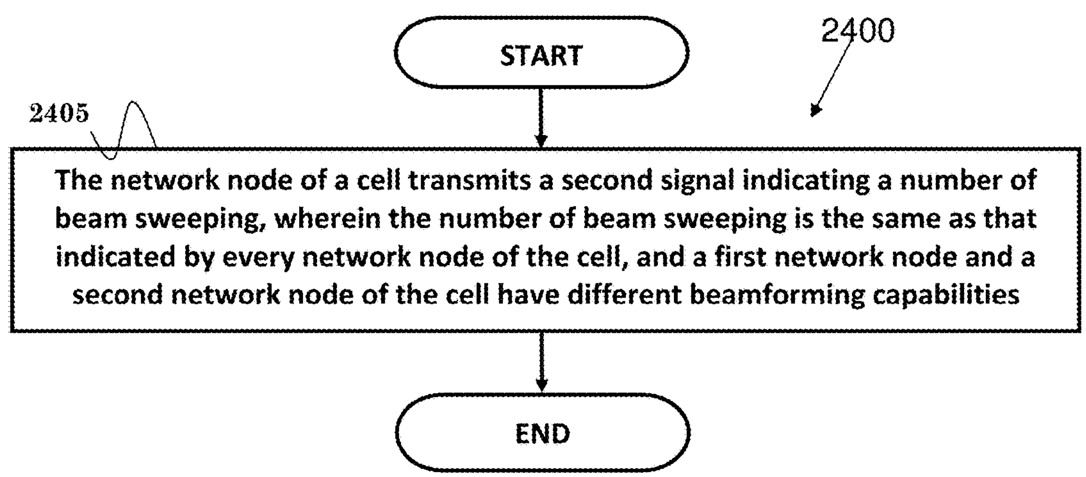
FIG. 24 is a flow chart according to one exemplary embodiment.

FIG. 24 is a flow chart 2400 according to one exemplary embodiment from the perspective of a network node. In step 2405, the network node of a cell transmits a second signal indicating a number of beam sweeping, wherein the number of beam sweeping is the same as that indicated by every network node of the cell, and a first network node and a second network node of the cell have different beamforming capabilities.

Referring back to FIGS. 3 and 4 the device 300 includes a program code 312 stored in the memory 310. The CPU 308 could execute program code 312 to transmit a second signal indicating a number of beam sweeping, wherein the number of beam sweeping is the same as that indicated by every network node of the cell, and a first network node and a second network node of the cell have different beamforming capabilities. Furthermore, the CPU 308 can execute the program code 312 to perform all of the above-described actions and steps or others described herein.

In the context of the embodiments disclosed in FIGS. 18-24 and discussed above, in one embodiment, the network node (e.g. the first network node and/or the second network node) could operate with multiple beams. Each network node of the cell could operate with multiple beams. The number of beams that the network node can generate concurrently is less than total number of beams in the network node.

In one embodiment, the beamforming capability could include a total number of beams, a number of beams that can be generated concurrently, and/or a beam sweeping number. A same number of beams could be generated by the network node for transmitting the first signal or the second signal, or by each network node of the cell for transmitting the first signal or the second signal.

In one embodiment, the first signal and/or the second signal could be transmitted at multiple time intervals using beam sweeping. In one embodiment, the first signal and/or the second signal could be a synchronization signal. Alternatively, the first signal and/or the second signal could be a reference signal. Alternatively, the first signal and/or the second signal could be a discovery signal. Alternatively, the first signal and/or the second signal could comprise system information. Alternatively, the first signal and/or the second signal could comprise paging. The first signal or the second signal could be transmitted via a channel. In one embodiment, the channel could be used to deliver synchronization signals. Alternatively, the channel could be used to deliver reference signals. Alternatively, the channel could be used to deliver discovery signals. Alternatively, the channel could be used to deliver system information. Alternatively, the channel could be used to deliver paging.

In one embodiment, the time interval could be a transmission time interval (TTI), a subframe, a symbol, or a unit on time domain.

In one embodiment, the beam sweeping could be performed to provide whole coverage of the cell or the network nodes. The number of beam sweeping could be a number of time intervals used to cover whole coverage of the cell or the network nodes, or a number of subset of beams used to cover whole coverage of the cell or the network nodes. The number of beam sweeping could be determined based on a number of beams that can be generated concurrently by a network node and total number of beams in the network node, or a number of beams that can be generated concurrently by other network node of the cell and total number of beams in other network node of the cell. The number of beam sweeping is indicated to UEs to be served by the cell. The number of beams that can be generated concurrently could be a number of beams that can be generated in a same time interval.

In one embodiment, the beam sweeping limited by the number of beam sweeping comprises that the beam sweeping is performed with a number of times no larger than the number of beam sweeping in a period of time, equal to the number of beam sweeping in a period of time, or less than the number of beam sweeping in a period of time.

In one embodiment, the network node may not able to transmit the signal with multiple beams to cover whole coverage of the network node in one time interval. Furthermore, the network node could be a TRP, a base station, or a 5G node. The signal comprises a common signal.

In one embodiment, transmitting the first signal using beam sweeping means to transmit the same first signal using different subset of beams in different time intervals during a period of time.

Based on above method(s) and/or embodiment(s), signaling overhead of beam sweeping number can be reduced within a cell while different number of beam sweeping may still be used.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a UE (User Equipment), comprising:

receiving a second signal indicating a number of beam sweeping from a cell, wherein there are multiple network nodes in the cell and at least two network nodes of the cell have different beamforming capabilities, and the number of beam sweeping comprises a number of time intervals used to cover whole coverage of the cell or the network nodes; and receiving a first signal from any network node of the cell at multiple time intervals based on the number of beam sweeping.

2. The method of claim 1, wherein the first signal is transmitted by any network node of the cell using beam sweeping limited by the number of beam sweeping.

3. The method of claim 1, wherein a beamforming capability of a network node of the cell comprises at least one of a total number of beams, a number of beams that can be generated concurrently, and a beam sweeping number.

4. The method of claim 1, wherein the first signal comprises a synchronization signal, system information, and/or paging.

5. The method of claim 1, wherein the second signal comprises system information.

6. A method of a network, comprising:

transmitting a second signal indicating a same number of beam sweeping from every network node of a cell, wherein there are multiple network nodes in the cell and at least two network nodes of the cell have different beamforming capabilities, and the number of beam sweeping comprises a number of time intervals used to cover whole coverage of the cell or the network nodes.

7. The method of claim 6, wherein a beamforming capability of a network node of the cell comprises at least one of a total number of beams, a number of beams that can be generated concurrently, and a beam sweeping number.

8. The method of claim 6, wherein the second signal comprises system information.

9. The method of claim 6, wherein the network uses beam sweeping limited by the number of beam sweeping to transmit a first signal from every network node of the cell.

10. The method of claim 6, wherein the first signal comprises a synchronization signal, system information, and/or paging.

11. A User Equipment (UE), comprising:

a control circuit;

a processor installed in the control circuit; and a memory installed in the control circuit and operatively coupled to the processor;

wherein the processor is configured to execute a program code stored in the memory to:

receive a second signal indicating a number of beam sweeping from a cell, wherein there are multiple network nodes in the cell and at least two network nodes of the cell have different beamforming capabilities, and the number of beam sweeping comprises a number of time intervals used to cover whole coverage of the cell or the network nodes; and receive a first signal from any network node of the cell at multiple time intervals based on the number of beam sweeping.

12. The UE of claim 11, wherein the first signal is transmitted by any network node of the cell using beam sweeping limited by the number of beam sweeping.

13. The UE of claim 11, wherein a beamforming capability of a network node of the cell comprises at least one of a total number of beams, a number of beams that can be generated concurrently, and a beam sweeping number.

14. The UE of claim 11, wherein the first signal comprises a synchronization signal, system information, and/or paging.

15. The UE of claim 11, wherein the second signal comprises system information.

16. A network, comprising:

a control circuit;

a processor installed in the control circuit; and a memory installed in the control circuit and operatively coupled to the processor;

wherein the processor is configured to execute a program code stored in the memory to:

transmit a second signal indicating a same number of beam sweeping from every network node of a cell, wherein there are multiple network nodes in the cell and at least two network nodes of the cell have different beamforming capabilities, and the number of beam sweeping number comprises a number of time intervals used to cover whole coverage of the cell or the network nodes.

17. The network of claim 16, wherein a beamforming capability of a network node of the cell comprises at least one of a total number of beams, a number of beams that can be generated concurrently, and a beam sweeping number.

18. The network of claim 16, wherein the second signal comprises system information.

19. The network of claim 16, wherein the network uses beam sweeping limited by the number of beam sweeping to transmit a first signal from every network node of the cell.

20. The network of claim 16, wherein the first signal comprises a synchronization signal, system information, and/or paging.

* * * * *